July 7, 1931.   T. HERNÁNDEZ   1,813,494
REAR WHEEL FOR TRACTORS
Filed July 29, 1929

INVENTOR.
Tomas Hernandez
BY
ATTORNEY

Patented July 7, 1931

1,813,494

UNITED STATES PATENT OFFICE

TOMÁS HERNÁNDEZ, OF BUENOS AIRES, ARGENTINA

REAR WHEEL FOR TRACTORS

Application filed July 29, 1929. Serial No. 381,991.

This invention relates generally to tractors and has more particular reference to a novel improved tractor driver wheel.

The invention has for an object the provision of a device of the class mentioned which is of simple durable construction, desirable and efficient in action, and which can be manufactured and sold at a reasonable cost.

The device proposes the use of a circular rim for forming the tractor wheel, and provided with internal gear teeth meshing with several small gears rotatively supported and in turn meshing with a driver gear which is on a shaft adapted for connection with a means for propulsion of the said tractor. It is pointed out that this wheel has no spokes, and the said rim is merely supported for rotation on the dentate wheels. This system increases considerably the power, since the driver wheel is small and rotates several times for each rotation of the rim. Furthermore this arrangement is such that many pieces of complicated parts of tractor transmissions and differentials may be abolished.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figure 1:
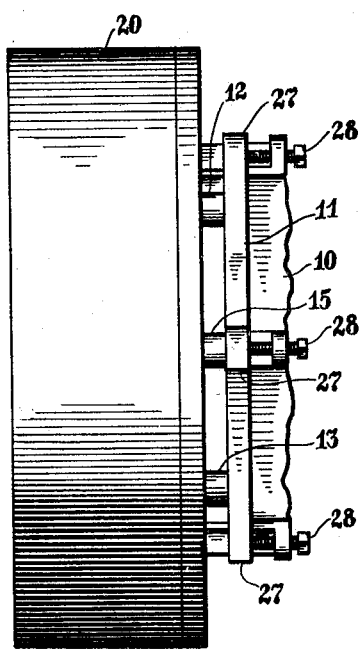
Fig. 1 is a side elevational view of a device constructed according to this invention.
Figure 2:
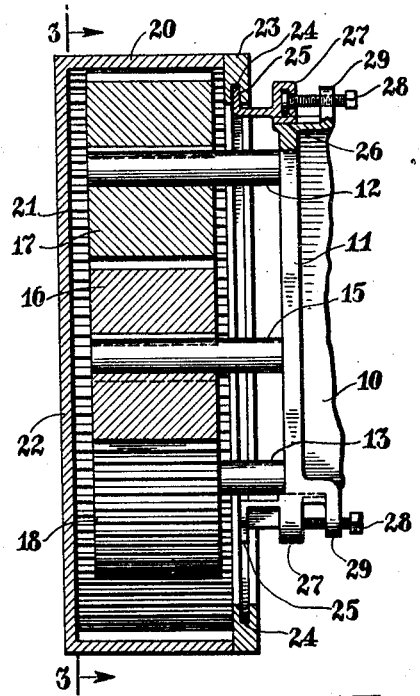
Fig. 2 is a central vertical sectional view thereof.

The reference numeral 10 indicates generally a portion of a tractor body in the region of the driver wheels of the tractor. A triangular support plate 11 is secured to the body 10, and is positioned with an apex at the top, and shafts 12, 13 and 14 project from the apexes of this plate and are rotatively mounted.

A driver shaft 15 adapted for connection with the power propulsion of the tractor extends from within the body 10, and thru the plate 11 at the center of a theoretical circle scribed thru the centers of the shafts 12, 13 and 14 these shafts being so positioned that this is possible.

Figure 3:
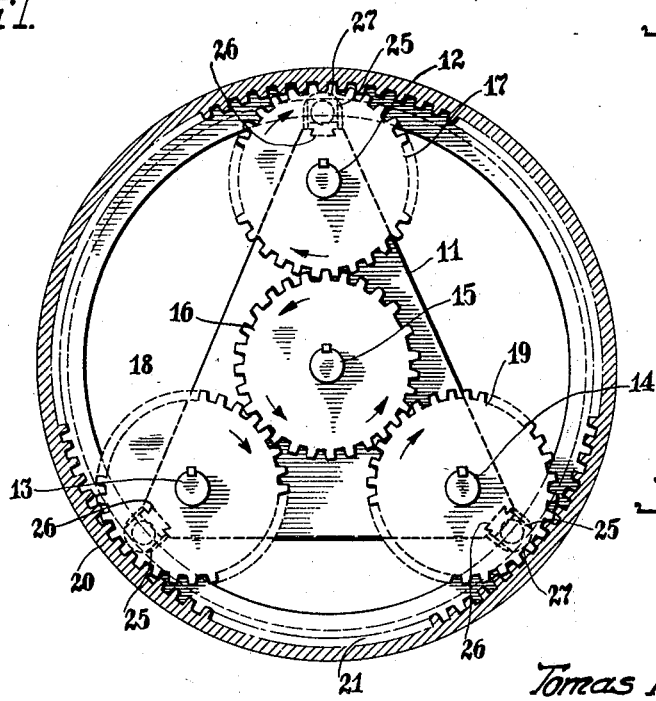
Fig. 3 is a transverse vertical sectional view, taken on the line 3—3 of Fig. 2.

A driver gear 16 is fixed on the shaft 15, and meshes with each of the driven gears 17, 18 and 19 fixed on the shafts 12, 13 and 14, respectively. A circular rim member 20 is formed with internal teeth 21 meshing with the gears 17, 18 and 19. Referring in particular to Fig. 3 it is pointed out that should the driver gear 16 turn anti-clockwise, each of the driven gears 17, 18 and 19 will rotate clockwise and the rim 20 will also turn clockwise.

The rim member 20 may have a closed end 22, and a flange 23 secured to the opposite end. This flange 23 has an internal groove 24 engaged by fingers 25 integral with slides 26 working on the plate 11 and the body 10. Each of the slides have enlarged ends 27 in which screws 28 are rotatably mounted and these screws engage threadedly in standards 29 fixed to the body 10.

The screws 28 may be manually turned for moving the slides 26 for adjusting the position of the rim 20 and the closed end 22 with respect to the spur gears.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A tractor wheel, comprising a plate adapted for engagement upon the body of a tractor, a driver shaft extending therethru, a driver gear fixed on the shaft, several gears positioned about the driver gear and meshing therewith, and supported for rotation from shafts rotatively mounted in the plate, and a rim with internal teeth arranged for rotation on the said driven gears and a means for rotatively and laterally holding the rim relative with the driven gears, comprising a flange formed on the rim and formed with an internal groove, slides mounted on the plate and body, and means attached to said slides for holding the same in adjusted positions on said plate and body.

2. A tractor wheel, comprising a plate adapted for engagement upon the body of a tractor, a driver shaft extending therethru, a driver gear fixed on the shaft, several gears positioned about the driver gear and meshing therewith, and supported for rotation from shafts rotatively mounted in the plate, and a rim with internal teeth arranged for rotation on the said driven gears and a means for rotatively and laterally holding the rim relative with the driven gears, comprising a flange formed on the rim and formed with an internal groove, slides mounted on the plate and body, and means attached to said slides for holding the same in adjusted positions on said plate and body, said means including end lugs integral with said slides, standards attached on said body, and adjusting screws threadedly engaging said standards and rotatively mounted in the slide lugs.

In testimony whereof I have affixed my signature.

TOMÁS HERNÁNDEZ.